United States Patent Office 3,533,296
Patented Oct. 13, 1970

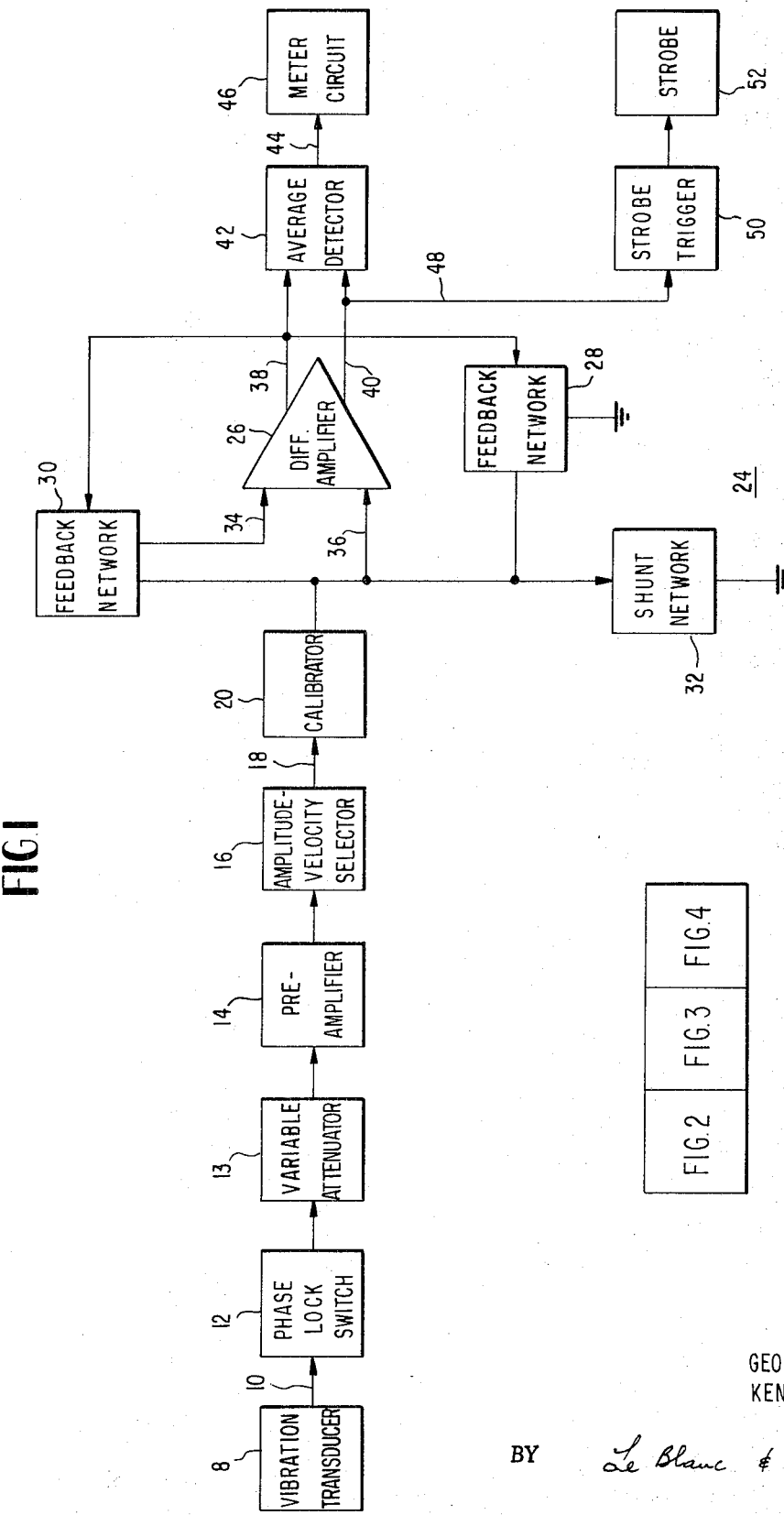

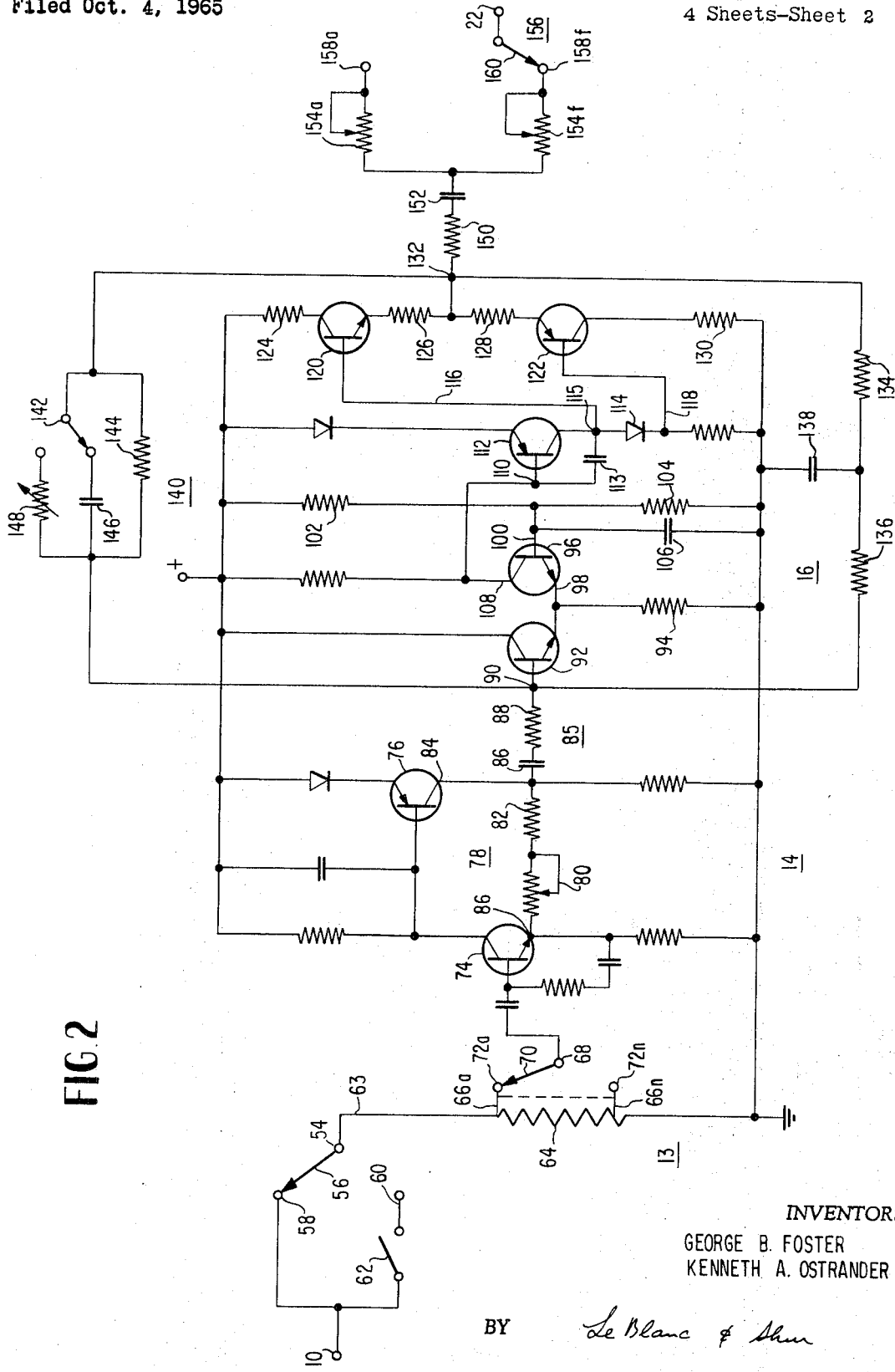

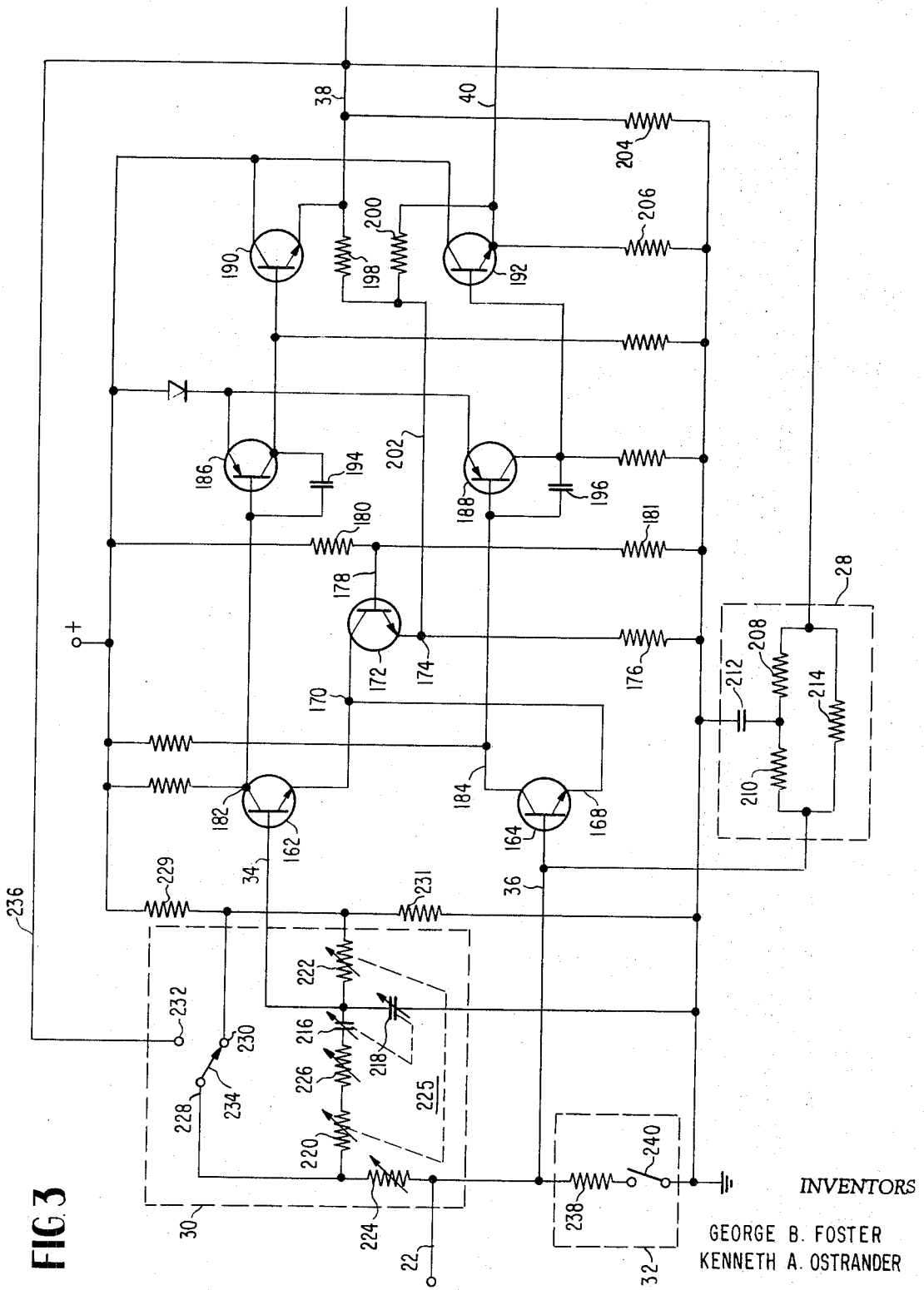

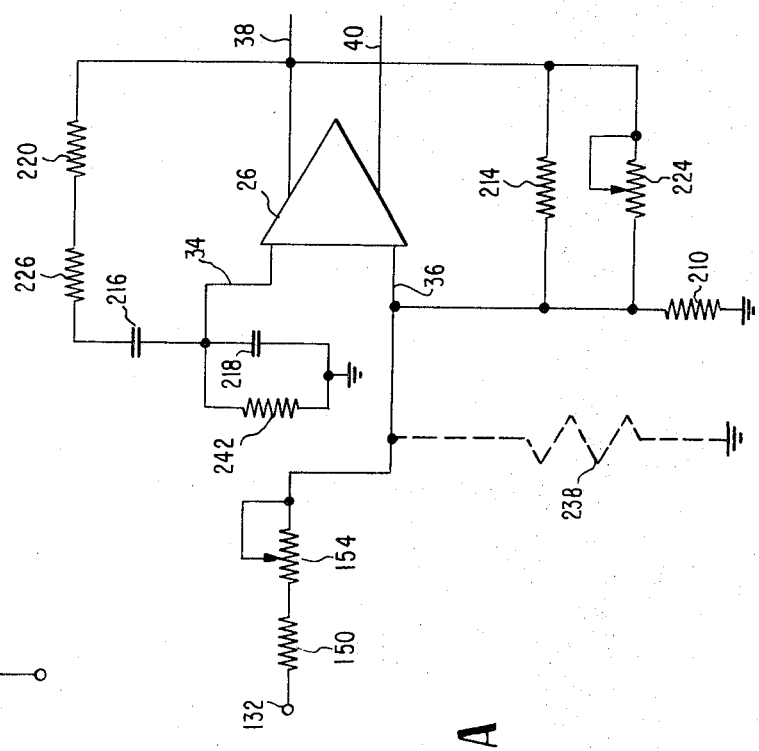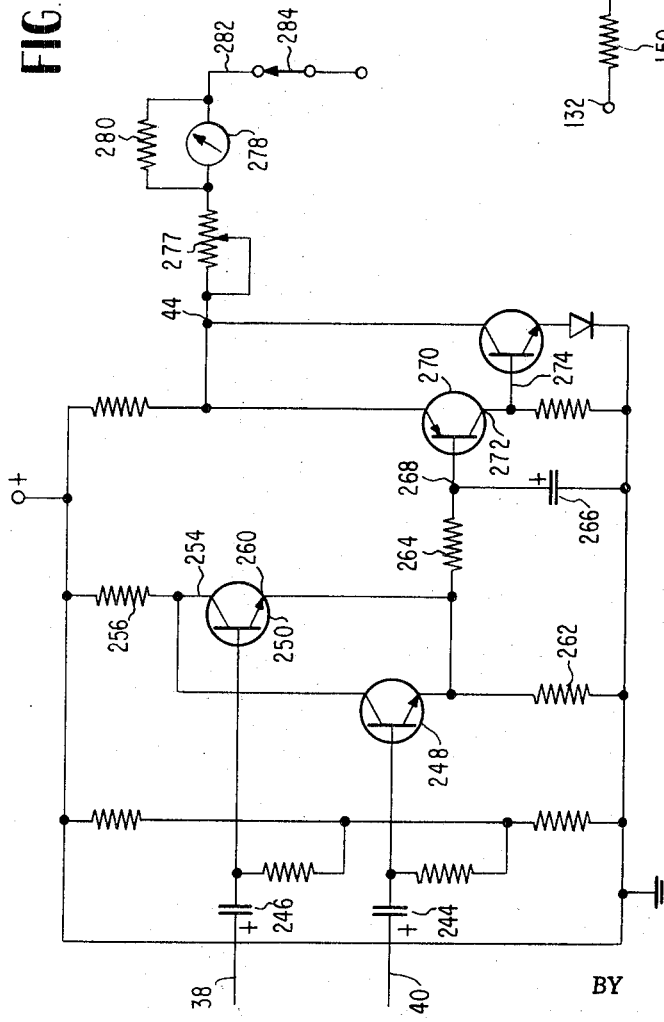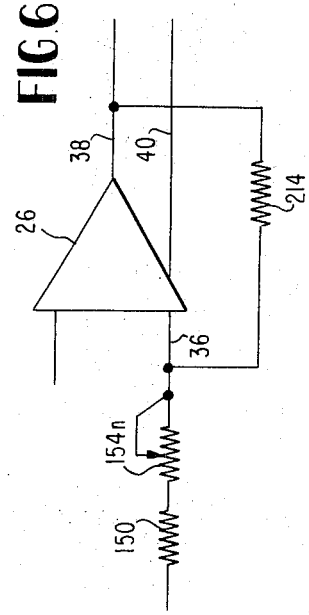

3,533,296
APPARATUS FOR VIBRATION DETECTION AND ELIMINATION EMPLOYING A TRIGGERED OSCILLATOR STROBOSCOPIC FLASH AND MULTI-FUNCTION MEASUREMENT CIRCUITRY
George B. Foster, Worthington, and Kenneth A. Ostrander, Columbus, Ohio, assignors to Reliance Electric & Engineering Co., Cleveland, Ohio, a corporation of Ohio
Filed Oct. 4, 1965, Ser. No. 492,661
Int. Cl. G01m 1/22
U.S. Cl. 73—466
9 Claims

ABSTRACT OF THE DISCLOSURE

There is disclosed herein method and apparatus for balancing vibrating machinery using a stroboscope triggered at the vibration frequency and a vibration amplitude transducer to facilitate preparation of a vector plot of vibration. The apparatus includes a novel multi-functional (multimode) circuit which operates selectively as a broad band amplifier, a tuned amplifier, a synchronized oscillator, or a free running oscillator to accomplish the various necessary phases of the vibration balancing operation. In the synchronized oscillator mode, the multimode circuit serves to drive the triggering circuit for the stroboscope in constant phase relationship with the measured vibration.

---

This invention relates to vibration analysis and to balancing of vibrating machinery, and more particularly to apparatus which provides greater economy and substantially increased precision in the detection and correction of harmful vibrations in motors and other vibrating machinery.

Apparatus for use in vibration analysis includes both devices to measure and identify a wide range of vibrations and apparatus which cooperates with the measuring and analyzing equipment to facilitate the elimination or reduction of the vibration, preferably without necessity of dismantling the piece of machinery under consideration.

One particular source of vibration often encountered in rotating machines results from improper mass distribution in the rotating parts. Such "rotor imbalance," as it is called, produces a periodic resultant force acting on the member causing vibration at the frequency of rotation and possibly at other frequencies. If a vibration transducer (pickup or sensor) is placed on the machine, a composite vibration is detected.

As is known, the vibration transducer produces a signal which is a function of the vibration and which varies in phase depending upon the relative position of the sensor unbalance on the device under observation, such as, for example, a flywheel on a motor. Moreover, if a vibration measurement is made with the sensor in a given position, and a test weight is added to the rotating member to change its effective center of imbalance, and a second vibration measurement is made with the sensor in the same position, then a further phase shift is found to have been introduced.

This phase difference between the two measurements may be directly correlated with the angular displacement of the test weight from the actual point of imbalance. In addition, computation of the actual vibration levels before and after the addition of the test weight may be used to determine the amount of weight which must be finally added to the rotating member in order to effect balance thereof.

The simplest way of utilizing the above-described phenomena is to place a suitable mark on the member to be balanced, to attach a sensor to the machine at some convenient place, and to illuminate the rotating mark by means of a stroboscopic flash operated in synchronism with the vibration measured by the sensor. If the "strobe" is in fact synchronized with the vibration of the rotating member, then the mark will be frozen in place; i.e., the member will make precisely one revolution for each flash of the strobe and the mark will appear in precisely the same position during each flash.

Addition of the test weight will cause the mark to appear in a new position, due to the shift in the effective point of imbalance. The angular displacement between the two marks may be measured and used to determine the actual point of imbalance. Direct measurement of the sensor outputs with and without the added test weight, by means of a meter or other suitable device, provides an indication of the level of vibration.

A suitable procedure for making the above-outlined determination is as follows:

(1) The stroboscope is connected to the vibration sensor output and suitably adjusted to fire in synchronism with the vibration signal, thereby apparently freezing the mark on the rotating part.

(2) The angular position of the mark (e.g., relative to the face of the clock) and the amplitude of the vibration are noted and plotted as a vector having its polar coordinates determined by the noted angle and amplitude.

(3) The machine is then stopped and a test weight of known mass is attached to the rotating member in any convenient manner.

(4) The machine is then put in operation again, illuminated by the synchronized stroboscope, and the new position of the mark and the new amplitude of vibration are noted. A second vector having as its polar coordinates the new position and new vibration level, is plotted "tail-to-tail" with the first vector.

(5) The vectors are subtracted; i.e., a line is drawn from the end of the second vector to the end of the first vector.

(6) From the magnitude and angle of the difference vector, the final balance weight and position thereof may be calculated. The angle between the difference vector and the original vibration vector (plotted according to Step 2 above) determines the angle between the position of the test weight and the final position of the balancing weight. The ratio of the test weight to the final weight is equal to the ratio of the length of the difference vector to the original vibration vector.

(7) Final balancing may then be accomplished by positioning an appropriate weight at the same radial distance as the test weight, and displaced therefrom by the angle between the difference vector and the original vibration vector.

An extremely simple apparatus for carrying out the above procedure would include an amplifier connecting the output of a vibration sensor to a suitable meter movement, and to a trigger circuit for the stroboscope. The trigger circuit may be of any conventional type and may comprise a clipping circuit and differentiator, or any other suitable circuit for producing a pulse train in frequency and phase synchronism with the input waveform.

Apparatus of the above-described type would be suitable if the vibration actually present was monotonic and of constant amplitude. In reality, however, there is present additional vibration at a large number of other frequencies. Such vibration is caused by the movement of various portions of the machine at speeds other than the rotational speed of the unbalanced part—gear whine, bearing noises, structural resonances, etc. Accordingly, the electrical output of the vibration sensor is of an extremely complex waveform, covering a broad frequency spectrum.

Great difficulty may be encountered in accurately and repeatably synchronizing the stroboscope flash to the desired component of this complex signal. In addition, if the amplitude of the vibration signal varies, then the phase of the stroboscope flash may further vary, due to the presence of amplitude-sensitive circuits in the trigger generator. The visible effect of the multiplicity of frequency components and amplitude variation in the vibration signal, is to cause movement from cycle to cycle of the position at which the mark appears on the rotating member. Because of this apparent motion, it is impossible to establish with precision the phase variation resulting from addition of the test weight.

In view of the above difficulty, vibration analyzers generally have included one or more highly tuned amplifiers adjusted for response to the frequency of machine rotation. This latter technique does represent an improvement, but it is not entirely satisfactory, for three main reasons:

First, even small deviations of the vibration frequency due to changes in rotational speed from that of the tuned filter cause substantial phase shift in the stroboscope trigger, since sharply tuned filters are characterized by zero phase shift at the center frequency, with large variations for even small frequency deviations.

Second, in order to assure the absence in the amplifier output of vibration signals displaced only slightly in frequency from the desired signal, extremely selective filters are necessary. This is not only expensive but also tends to accentuate the phase shift which results from even small frequency changes.

Finally, changes in vibration amplitude may still directly affect the phase of the stroboscope trigger signal.

The operation of the tuned amplifier equipment has been found to be adequate, at least for the balance of low-speed machinery and internal-combustion engines. In such machines, reduction of the vibration to an acceptable level may be achieved even though the rotating member is far from precisely balanced. Completely accurate balancing of the rotating member is not possible, since there generally remains a certain amount of cycle-to-cycle phase variation in the stroboscope trigger signal, causing jitter in the position of the mark.

The above limitations of standard vibration analyzers have been recognized and understood for considerable time. Attempts to overcome these difficulties have been principally directed at improving and refining the previously used techniques.

As an example of such refinements directed primarily at minimizing the effects of variations in rotational speed, reference is made to U.S. Pat. No. 3,030,813, wherein the general problems mentioned above are further discussed. According to the above U.S. patent, there is provided a device comprising a pair of strobe channels which are adapted, in various ways, to fire in synchronism only when the rotating machine is operating at a precise predetermined speed. An alternative embodiment shows the use of a first strobe to measure and precisely adjust the engine speed and a second, independent strobe which fires only when the machine is operating at the desired rotational speed. As may be understood, such systems are extremely complex and, like the simple tuned-circuit-type equipment, are not readily adaptable to the solution of certain critical vibration problems.

In the case of high-speed machinery such as compressor and turbine rotors in jet engines, where rotational speeds in excess of 10,000 r.p.m. are common, even a very small imbalance can cause critical high-frequency vibrations. Presently available equipment has not proven completely satisfactory to accomplish the precise balancing required in such situations.

In particular, as long as the imbalance vibration is substantially greater than the various unrelated vibrations not caused by that imbalance, and is sufficiently separated in frequency, the tuned-amplifier-type arrangement provides an adequate synchronizing signal for the stroboscope. The above conditions are substantially met in low-speed machinery. However, in the high-speed machinery the imbalance vibration and other vibrations differ in frequency by only a slight amount, and critical vibration caused by imbalance is often of substantially the same amplitude as the various unrelated vibrations. With previously available equipment it has not been possible to provide a meaningful synchronizing signal for the stroboscope under the latter conditions. It will be understood that, as the balance of the rotating device is improved, the vibration signal decreases in amplitude and practically disappears in the extraneous vibration or "noise," thereby imposing a fixed limit on the precision of balance which is attainable.

In order to achieve the desired precision in balancing of high-speed machines, the present applicants have taken an entirely new approach to the problem of synchronizing the trigger signal with the machine vibration, and have departed from the conventional technique of using the transducer signal, suitably filtered and amplified, in order to fire the stroboscopic light. Basically, the apparatus of the present invention comprises a novel synchronized oscillator to drive the stroboscope triggering circuit. As a result, all effects of variation in the vibration amplitude are eliminated. The trigger circuit may be adjusted to respond to the output of the oscillator in a continuously repeatable manner, thus preventing apparent motion of the mark due to changes in vibration amplitude. The oscillator is synchronized with the output of a vibration sensor in a novel manner so that the stroboscope flash and the input vibration are maintained in a constant phase relationship, even when the desired vibration is of substantially the same amplitude and of nearly the same frequency as various other unrelated vibrations or "noise." Thus, with the present invention, it is possible to eliminate even slight unbalance, which could cause low level, but nonetheless critical, vibrations in high-speed rotating machines.

In addition, the present invention is characterized by extreme simplicity, whereby it may be adapted for convenient portable use. The apparatus is capable of extremely accurate measurements at low, as well as high, rotational speeds. One tested embodiment of this invention provides extreme accuracy for rotational speeds as low as approximately 170 r.p.m. and as high as approximately 300,000 r.p.m. No equipment possessing a high degree of accuracy over so broad a range of frequencies has been heretofore available.

Accordingly, it is an object of this invention to provide an improved vibration analyzer and balancer. More particularly, it is an object of this invention to provide a vibration analyzer for use in the measurement and elimination of rotor imbalance.

It is also an object of this invention to provide a vibration analyzer which may be made substantially insensitive to variations in vibration amplitude, and to vibration signals of frequencies other than that caused by the imbalance.

It is a further object of this invention to provide means for reducing low-level, high-frequency vibrations to a degree heretofore impossible, and to provide, at the same time, apparatus useful at lower frequencies which is more accurate and less complex than that previously available.

It is additionally an object of this invention to provide apparatus as described above which retains the various desirable features of present equipment. More specifically, it is an object of this invention to provide a vibration analyzer which avoids the necessity of directly synchronizing a stroboscope with the vibration of a rotating member.

It is still another object of this invention to provide a vibrating-sensing apparatus in which a stroboscope trigger signal is generated by a variable-frequency oscillator in precise phase synchronism with the output of the vibration sensor.

It is an additional object of this invention to provide a vibration analyzer as described above which retains the desirable features previously available, by the use of a novel amplifier-oscillator configuration which may be controlled over a previously unavailable frequency range and readily converted from a stable, high-selective amplifier to a precisely controlled synchronized oscillator.

A further object of this invention is to provide a method of balancing of rotating machines which does not depend on direct synchronization of one or more stroboscopes with the vibration of the machine to be balanced.

It is an additional object of this invention to provide a method as described above which may be used with great accuracy on high-speed as well as on low-speed machinery.

The exact nature of this invention, as well as further objects and advantages thereof, will be readily apparent from consideration of the following specification and the accompanying drawings, in which:

FIG. 1 is a block diagram of the novel vibration analyzer of the present invention;

FIG. 2 is a circuit diagram of the phase lock switch, the variable attenuator, the preamplifier, the velocity-amplitude selector and the calibrator shown in FIG. 1;

FIG. 3 is a circuit diagram of the novel amplifier-oscillator configuration shown in FIG. 1;

FIG. 4 is a circut diagram of the average detector and meter shown in FIG. 1;

FIG. 5 shows the manner in which FIGS. 2–4 are to be connected to produce the configuration shown in FIG. 1; and FIGS. 6A and 6B show further details of portions of the amplifier-oscillator circuit shown in FIG. 3.

Referring now to FIG. 1, there is shown a functional diagram of the vibration analyzer of this invention. A suitable vibration sensor 8 is connected at input terminal 10 to a phase lock switch 12, which serves in a manner to be explained, to permit the triggering of a stroboscope in either a free-running or synchronized mode. The output of phase lock switch 12 is provided to a variable attenuator 13 which serves to control the signal output of sensor 8, whereby to permit use of the system over a wide range of vibration levels. Variable attenuator 13 may have a number of predetermined settings corresponding to full scale displacements on an appropriately calibrated vibration meter. For example, in a typical embodiment of this invention there might be provision for full scale readings of 0.1, 0.3, 1.0, 3.0, 10.0, 30.0, 100.0 and 300.0 mil inch peak-to-peak displacement.

In order to provide adaptability to a wide variety of sensors, there may be included a variable-gain preamplifier 14, whereby, for a given attenuator setting and a known vibration level, the appropriate meter reading is obtained.

The commonly available types of vibration sensors, pickups or transducers, suitable for use with the present invention are of the type which provide an output proportional to the velocity rather than to the amplitude of vibration. Accordingly, there may be provided an amplitude-velocity selector 16 to provide at output 18 a signal proportional either to the vibration amplitude or to the velocity, as desired.

Amplitude-velocity selector 16 may comprise a high-gain amplifier, the output of which may be selectively connected to the input through either a capacitive or resistive feedback network. When the feedback signal is provided through the capacitive network, the circuit will act as an integrator, thereby providing an output on lead 18 proportional to the actual vibration amplitude. When the feedback is provided through the resistive network, the amplifier exhibits a substantially flat frequency characteristic, whereby the output on lead 18 remains representative of the velocity signal provided by the sensor.

The signal on lead 18 may be provided to suitable calibration circuit 20 including a selector switch and a number of presettable variable resistances, whereby the gain characteristics of circuits 14 and 16 may be precisely controlled independently for each of a number of frequency decades, selection of which is subsequently described. The output of calibration circuit 20 is provided over lead 22 to the input of a novel multimode circuit 24 which comprises the heart of the present invention. Multimode 24 comprises a differential amplifier 26, and a pair of feedback networks 28 and 30. An additional shunt network 32 is connected to lead 22, and to the feedback networks 28 and 30.

Amplifier 26 includes first and second inputs 34 and 36, and a corresponding pair of outputs 38 and 40. The amplifier is so arranged that the signal at output 38 is representative of the difference between the inputs at terminals 34 and 36, while the output at terminal 40 is representative of the difference between the inputs at 36 and 34. In other words, considering terminal 34 as the positive input and terminal 36 as the negative input, terminal 38 provides the corresponding positive output while terminal 40 provides a negative output, 180 degrees out of phase with that at terminal 38.

The positive output at terminal 38 is fed back to inputs 34 and 35 through the feedback networks 28 and 30, to provide the desired operational characteristics. Networks 28, 30, and 32 include appropriate switches, whereby circuit 24 may operate as a wide-band amplifier, as a highly selective tuned amplifier, or as a variable frequency oscillator with precisely controlled output. In the latter mode, appropriate positioning of the switches in shunt network 32 and phase lock switch 12 permits the operation of circuit 24 either as a free-running or as a phase-locked oscillator, precisely synchronized in phase with any vibration at the frequency of oscillation.

Thus, as may be seen, by the appropriate control of the various selection switches provided in the system, the signals appearing at outputs 38 and 40 may either be directly representative of the composite velocity signal measured by transducer 8 or of the integral thereof, or of a precisely selectable frequency component of the velocity signal, or its integral. Alternatively, the amplifier outputs 38 and 40 may provide a constant amplitude sinusoidal signal generated by a precisely controllable variable-frequency oscillator and either completely unrelated in phase to the corresponding frequency component of the vibration signal or phase locked therewith so as to maintain a precise relationship between the imbalance vibration and the oscillator output, independent of unrelated adjacent frequency components or small changes in the frequency of machine rotation.

The signals appearing at outputs 38 and 40 are provided to an average-detector circuit 42 which provides at output 44 a DC signal representative of the average value of the output of circuit means 24. Use of an average-value detector, rather than a peak detector is preferred, since the former is less sensitive to random transient vibrations which are of no concern in the elimination of imbalance. The signal appearing on lead 44 is provided to a suitable meter circuit 46 which provides an instantaneous indication of the average value of the vibration. If desired, a suitable recorder may be connected to lead 44 to provide a permanent record of the vibration.

Output terminal 40 of multimode circuit 24 is further connected by means of lead 48 to a suitable strobe trigger generator 50. The latter circuit responds to the signal appearing on lead 48 to provide precisely-timed current pulses to a suitable stroboscope 52. According to the present invention, use of strobe 52 is only necessary at such times that multimode circuit 24 is operating either in its free-running or phase-locked oscillator modes, whereby the signal appearing at lead 48 is a constant amplitude sine wave of precisely controllable phase.

Trigger circuit 50 may comprise a clipper and an appropriate differentiator, to provide a trigger pulse whenever the input sine wave on lead 48 crosses zero (or other desired amplitude) either in the positive or negative going direction. The trigger pulses may serve to fire a thyratron or other suitable switch to connect a charged capacitor to the stroboscope lamp. Suitable means may be provided to rapidly recharge the capacitor to a sufficient voltage for firing the strobe lamp at the occurrence of the next trigger pulse.

From a consideration of the circuit configuration shown in FIG. 1, it may be readily seen that there are provided many of the desirable standard features heretofore available in vibration-analysis equipment, such as measurement of the vibration amplitude or velocity in either composite or component form (wide band amplifier mode and tuned amplifier mode, respectively, of multimode circuit 24), and, in addition, an entirely new concept in the synchronization of a stroboscope with the measured vibration signal (synchronized oscillator mode of multimore circuit 24). Thus, even in the presence of variable-amplitude low-level vibration signals, there may be provided an accurately positioned and jitter-free mark on the rotating member, whereby balancing accuracy heretofore impossible is achieved.

Referring now to FIGS. 2–4, there is shown in diagram of a circuit for mechanizing the various functions described in connection with FIG. 1. The vibration signal is provided on lead 10 to the phase lock switch 12, which basically comprises a two-position selector switch 54 having an arm 56 and a pair of fixed contacts 58 and 60. Contact 58 is directly connected to input terminal 10, while contact 60 is connected to input terminal 10 by means of a further, normally open switch 62. In its normal position, switch 54 provides a connection between arm 56 and contact 58, whereby the vibration signal appearing at input terminal 10 is continuously connected to the upper end 63 of a multiply tapped resistor 64, which serves as the variable attenuator.

In the off-normal position of switch 54, the upper end 63 of resistor 64 is connected through arm 56 to terminal 60. In this position, which corresponds to the oscillator mode for multimode circuit 24 in FIG. 1, it may be seen that there is no connection between the output of pickup 8 at input terminal 10 and the remainder of the system unless switch 62 is closed. The normal position of switch 62 therefore corresponds to the operation of multimode circuit 24 with no synchronizing input signal, i.e., in its free-running condition. As will be described, when switch 62 is closed, and the remainder of the circuit is appropriately connected for operation in the oscillator mode, the output of the vibration transducer is connected to multimode circuit 24 to provide a phase-control signal to synchronize the output of strobe trigger circuit 50 with vibration at the rotational frequency of the machine.

Multiple tap resistor 64 provides variable attenuation for the input signal provided through the arm 56 of switch 54. As may be understood, the position of taps 66a through 66n will be selected on the basis of the degree of attenuation desired at each position. A multiple-position selector switch 68 including an arm 70 and a plurality of stationary contacts 72a through 72n provides control of the attenuation to be introduced. It should be recognized that an alternative configuration of resistor 64 could include either a continuously-variable precision potentiometer or a series of resistors connected between point 63 and ground, with taps 66a through 66n comprising appropriate connections between the series resistors.

Preamplifier 14 may comprise two transistors 74 and 76 and a resistive feedback circuit 78 comprised of variable resistor 80 and a fixed resistor 82 connected between the collector 84 of transistor 76 and emitter 86 of transistor 74. The negative feedback provided by resistors 80 and 82 determines the overall gain of the preamplifier 14, whereby vibration transducers providing both high- and low-level output signals may be readily accommodated.

The output of preamplifier 14 is connected by means of a coupling circuit 85 comprised of capacitor 86 and resistor 88 to the input of amplitude-velocity selector 16, as shown in FIG. 1. Selector 16 is comprised of a five-stage feedback-stabilized transistor amplifier and a variable AC feedback path, whereby operation as a wideband AC amplifier or as a Miller integrator circuit may be obtained.

Specifically, the signal provided from preamplifier 14 is connected to base 90 of transistor 92 which operates with resistor 94 as an emitter-follower circuit. A second transistor 96 is connected in a common-base configuration at its emitter terminal 98 to the output of emitter follower 92, to provide a first stage of actual amplification. Base 100 of transistor 96 is provided with an appropriate DC reference level by means of a voltage divider comprised of resistors 102 and 104 between positive battery and ground. A large capacitor 106 provides an AC short circuit at base 100. Collector 108 of transistor 96 is connected at base terminal 110 of transistor 112 which operates as a common emitter amplifier. The collector circuit of transistor 112 includes a diode 114 across which there is provided, by means of leads 116 and 118, input signals to a pair of complementary emitter-follower circuits including transistors 120 and 122, respectively. A low-impedance output signal is provided at point 132.

Common emitter-amplifier circuit 112 may include a feed-back capacitor 113 connected between base 110 and collector 115 thereof, to suppress high-frequency oscillations.

Diode 114, connected between the inputs of complementary emitter-followers 120 and 122, serves to prevent cross-over distortion in the emitter-follower outputs. In addition, the placement of diode 114 improves the temperature stability of amplifier circuit 112.

Connected in the current path of transistors 120 and 122 are four small resistors 124, 126, 128 and 130. These resistors protect transistors 120 and 122 against a possible short circuit between output and ground, while resistors 126 and 128 additionally provide increased thermal stability for the circuit.

The output signal taken at terminal 132 is connected, by means of a pair of feedback resistors 134 and 136, to the base 90 of input emitter-follower 92. In addition, there is provided by means of a large capacitor 138, an AC short circuit from the junction of resistors 134 and 136 to ground, preventing AC feedback through resistors 134 and 136. The DC feedback through resistors 134 and 136 serves to improve temperature stability of the circuit, and reduces the effects of power-supply variation.

In addition to the DC feedback path, there is provided a second feedback network 140, including a selector switch 142, which determines the mode of operation of selector 16. Network 140 includes a resistor 144 selectively in parallel with a capacitor 146 or a variable resistor 148. By means of switch 142, an appropriate feedback connection is made either through capacitor 146—whereupon the circuit acts as an integrator—or through variable resistor 148—in which case the circuit behaves as a wide-band amplifier. In the former condition, the signal appearing at base terminal 90, which was representative of the velocity of vibration as measured by pickup 8, is integrated and appropriately scaled, whereby the signal appearing at output terminal 132 is an accurate representation of the displacement of the vibrating member.

When switch 142 is connected in the velocity position, there is provided purely resistive feedback, whereby the velocity signal itself appears at output terminal 132. Feedback resistor 148 is made variable, so as to appropriately scale the output when the circuit is operating in the velocity mode, to eliminate any scaling inconsistencies which might otherwise result between the integrating and non-integrating modes of circuit operation.

The output signal at terminal 132 is connected through a coupling resistor 150 and a capacitor 152 to a series of calibrating resistors 154a–154f which correspond to a number of frequency decades through which amplifier-oscillator 24 may be tuned. Each of resistors 154a–154f may be adjusted so that the signals appearing at the respective outputs thereof are precisely calibrated to provide proper amplitude signals in each frequency range. Connections between the outputs of calibrating resistors 154a–154f may be provided by a multiple-position rotary switch 156 having a plurality of stationary contacts 158a–158f and a rotating arm 160.

Referring now to FIG. 3, there is shown a circuit diagram of differential amplifier 26, feedback networks 28 and 30 and shunt network 32 comprising multimode circuit 24. Differential amplifier 26 comprises a pair of input transistors 162 and 164 having their respective emitters 166 and 168 connected in common to collector 170 of current-control transistor 172. A suitable current path to ground for emitter 174 of transistor 172 is provided through resistor 176. Base 178 is connected to a voltage divider comprised of resistors 180 and 182, which resistors are connected between the positive power supply and ground to provide a fixed DC operating level for transistor 172. Collectors 182 and 184 of transistors 162 and 164, respectively, are connected through a pair of amplifying transistors 186 and 188 to the respective bases of a pair of emitter followers 190 and 192.

Transistors 186 and 188 have connected thereto feedback capacitors 194 and 196, respectively, in order to suppress high-frequency oscillations. A further pair of feedback paths are provided between the outputs of emitter followers 190 and 192 by means of resistors 198 and 200, respectively. The latter resistors are connected by means of lead 202 to emitter 174 of current-control transistors 172, whereby to accurately control the operating point of transistors 190 and 192, to assure the greatest possible dynamic range.

Outputs 38 and 40 of multimode circuit 24 are provided, respectively, across resistors 204 and 206 in the emitter paths of transistors 190 and 192. As previously mentioned, output terminal 38 is the so-called "plus" output and output terminal 40 the negative output. The corresponding positive input is provided on lead 34 to input transistor 162 and the negative input is provided over lead 36 to the base of transistor 164.

As may be understood, the constant current which flows through transistor 172 is provided by transistors 162 and 164 in proportion to the voltages which appear on leads 34 and 36. Accordingly, the signals appearing at collectors 182 and 184 are representative, respectively, of plus and minus the difference between the signals on leads 34 and 36. Thus, after appropriate amplification, the signal on lead 38 is representative of the difference between the input at 34 and that at 36, while the output on lead 40 is equal to minus the signal appearing on lead 38.

Referring again to FIG. 1, there is seen a feedback network 28 connected between positive output 38 and negative input 36. As shown in FIG. 3, feedback network 28 includes a pair of series resistors 208 and 210 and a large capacitor 212 connected between the resistors and ground. Capacitor 212 provides an AC shunt to ground, whereby resistors 208 and 210 serve as a DC negative feedback path to insure bias stability for amplifier 26.

Network 28 further includes a resistor 214 to provide frequency-independent negative feedback from output 38 to input 36. The second feedback network 30 shown in FIG. 1 may be selectively adjusted to provide further negative feedback to input 36 and to provide, in addition thereto, frequency-selective positive feedback to the positive input terminal 34.

Feedback network 30 comprises a pair of ganged variable capacitors 216 and 218 and two ganged precision potentiometers 220 and 222. The network further includes a pair of independent variable resistors 224 and 226 and a two-position switch having stationary contacts 230 and 232 and a movable arm 234. Contact 232 is connected to lead 236 to provide a feedback signal to the network.

In its normal position, switch 228 is connected with arm 234 at terminal 230, whereby the feedback path through lead 236 is effectively disabled. This position corresponds to the so-called "filter-out" mode and, as will be explained subsequently, results in a substantially flat, wideband characteristic for difference amplifier 26 and correspondingly the wide band amplifier mode for multimode circuit 24. This mode is employed to measure and/or record the actual composite vibration signal as measured by the vibration sensor 8 and provided to input terminal 10 (FIG. 1).

When switch 228 is in its off-normal position, with contact 232 connected to arm 234 operation of multimode circuit 24 in the tuned amplifier mode is achieved, and, there are provided two separate feedback paths, a frequency-independent path comprised of variable resistor 224 effectively connected between output terminal 38 and input terminal 36, and a filter network 225 connected between output terminal 38 and input terminal 34. The former path provides an additional variable amount of negative feedback to control the overall gain of amplifier 26 when multimode circuit 24 is operating in the tuned-amplifier or "filter-in" mode. The frequency-sensitive network 225, on the other hand, provides a variable positive feedback signal causing substantial regeneration of certain frequencies, and corresponding degeneration of substantially all other frequencies.

Inasmuch as the feedback provided by resistors 214 and 224 is purely resistive, there is a certain amount of degeneration even at the frequencies for which filter 225 provides regeneration. Therefore, it may be understood that appropriate selection of circuit values will always assure that the negative feedback at all frequencies exceeds the positive feedback, so that amplifier 26 is not permitted to become unstable, i.e., to permit operation of multimode circuit 24 in its oscillatory modes as explained hereinafter. However, because of the particular configurations chosen for the various feedback paths, instability, i.e., oscillation, of amplifier 26 and of multimode circuit 24 may be selectively effected. By appropriate variation of the relative magnitudes of the positive and negative feedback, the former will predominate, and the system will go into oscillation at the frequency determined by the setting of filter network 225.

The frequency of regeneration is determined by the value of capacitors 216 and 218 and resistors 220 and 222, with additional trimming provided by a small resistor 226. Capacitors 216 and 218, while shown as continuously variable, may each alternatively comprise a plurality of fixed capacitors, differing successively by a factor of ten. A pair of ganged switches, which may also be coupled to switch 156, may function to selectively insert the appropriate ones of the fixed capacitors into the circuit to effect increases of factors 10 and 100 in the frequency of regeneration selected by potentiometers 220 and 222.

Control of the relationship between positive and negative feedback is provided by shunt network 32, comprising a resistor 238 and a switch 240 connected between input terminal 36 and ground. In the normal position of switch 240, resistor 238 is disconnected and has no effect on the operation of the circuit. This corresponds to either the velocity or amplitude modes of selector circuit 16 (FIG. 1) and either the filter-in or filter-out modes (tuned amplifier or broad band amplifier) as determined by switch 228. As will be explained, irrespective of the position of switch 228, as long as switch 240 is open there will never be a predominance of positive feedback at any frequency and amplifier 26 will be stable, operating either as a wide band or as a tuned amplifier.

On the other hand, when switch 240 is closed a portion of the negative feedback will be shunted to ground, whereby positive feedback provided to input terminal 34 will predominate over the negative feedback and oscillation of amplifier 26 will result. The particular configuration shown, including feedback network 28 and shunt network 32, is highly desirable, since the frequency characteristics of the network are conveniently controllable. Further, the amplitude and frequency stability of the oscillator thus constructed is extremely high, making this circuit highly suitable as a driver for the stroke trigger circuit, since the phase of the stroke trigger circuit must be precisely controlled.

Switch 228 is connected so that when it is in its normal position, the two ends of the filter 225 are connected to the junction of a pair of resistors 229 and 231 connected between the positive power supply and ground. When switch 228 is in its off-normal or "filter-in" position, the junction of variable resistors 220 and 224 is disconnected from the voltage divider and connected to feedback path 236 from output 38 of the amplifier. Variable resistor 222, however, remains connected to the voltage divider and provides a DC reference level on input 34 for transistor 162.

The operation of multimode circuit 24 may be best understood by references to FIGS. 6A and 6B, wherein there is shown the input and feedback circuitry determinative of the AC operation of amplifier 26 for each of the possible modes of operation. In FIG. 6A there is shown the circuit configuration when either a velocity or amplitude signal is provided at the output of selector 16, and with both switches 228 and 240 in their normal positions. This constitutes the broad band amplifier mode for multimode circuit 24. Here both the positive feedback and the negative feedback provided by means of resistor 224 (FIG. 3) are disabled, as is the shunting effect of resistor 238. Comparing the circuits of FIGS. 2 and 3 with that of FIG. 6A, it may be seen that the signal path for amplifier 26 is comprised solely of resistor 150, variable calibration resistor 154f (switch 156 being in its normal or filter-out position) and negative feedback resistor 214. Accordingly, since the open-loop gain of amplifier 26 is made quite large, the closed-loop impedance of the configuration of FIG. 6A is simply equal to the value of resistor 214 divided by the values of resistors 150 plus 154f. A suitable value for this gain may be in the vicinity of 100. As previously noted, under the conditions shown in FIG. 6A the signals provided at output terminals 38 and 40 are representative of the entire spectrum of vibration signals provided at input terminal 10.

When it is desired that circuit 24 operate in the active-filter, i.e., tuned amplifier, mode, the following circuit configuration is established (see FIGS. 2 and 3): Switch 54 remains in its normal position so that the input signals provided at terminal 10 may pass to the velocity-displacement selector 16; switch 142 is positioned in either of its two positions, depending on whether it is desired to measure the velocity or displacement of the vibration signal; switch 156, which is normally in the filter-out position with arm 160 resting on contact 158f, is positioned in any of the other remaining positions, to provide accurate calibration in each of the frequency ranges; switch 228 is transferred to its off-normal position, with arm 234 resting on contact 232, whereby the feedback signal provided over lead 236 is connected to the filter 225 and to the negative feedback resistor 224; and, finally, switch 240 remains in its open position, whereby to assure sufficient negative feedback so that circuit 24 remains stable. Under these conditions, the signal paths determinative of the circuit operation are shown in FIG. 6B. A positive feedback signal is provided from positive output terminal 38 through a filter comprised of resistors 220 and 226 and capacitor 216 shunted by a parallel combination of capacitor 218 and a resistor 242 (representative of the total of various shunt resistances present in the bias circuits, etc.).

The variable elements in the filter circuit 225 are so selected that the signal voltage appearing at input terminal 34 is approximately one-third the value of the output signal appearing at terminal 38 at the desired frequency, and decreases rapidly for all other frequencies. The frequency of maximum regeneration is determined by the dual potentiometer including sections 220 and 222 shown in FIGURE 3. As previously noted, in order to provide a wide range of available frequencies, variable capacitors 216 and 218 may each advantageously comprise a plurality of separate capacitors adapted to be selectively inserted into the network.

Referring again to FIG. 6B, negative feedback is provided by means of the parallel combination of resistors 214 and 224, and by a shunt path comprised of resistor 210 and an appropriate one of resistors 154 (depending on the setting of calibration switch 156) and 150 connected to the output terminal 132 of the velocity displacement selector 16. By appropriate adjustment of the circuit values, there may be provided a slightly greater amount of negative feedback than positive feedback; i.e., slightly over one-third of the signal level appearing at output terminal 38. It is found that best results are achieved when the negative feedback only slightly exceeds the positive feedback, whereby the operation of amplifier 26 is almost unstable, since higher selectivity is thereby achieved.

Under the conditions shown in FIG. 6B, at the particular frequency determined by filter 225, the positive and negative feedback are almost equal, while at all other frequencies there is substantially no positive feedback, thereby causing considerable degeneration in all but a narrow band near the filter resonance.

Therefore, it may be seen that circuit 24 may be adjusted over a wide range of frequencies to permit specified components of the vibration signal to be measured independently.

Heretofore, vibration analyzers have employed the output of tuned filters generally similar to that discussed above, for the purpose of synchronizing a stroboscopic flash with the particular frequency of rotation of the member to be balanced. In contrast, in the present invention very significant and unexpected improvements in balancing precision may be achieved by permitting the positive feedback in circuit 24 to exceed the negative feedback at the frequency of rotation of the member to be balanced. In the present invention this is accomplished by effectively decreasing the value of shunt resistor 210, as shown in FIG. 6B.

More precisely, referring to FIGS. 2 and 3 when it is desired that circuit 24 operate in its unstable modes, i.e., as a free running or synchronized oscillator, it is merely necessary to establish switches 54 and 240—which may, for convenience, be mechanically coupled—in their respective off-normal positions. Thus the input at terminal 10 is decoupled from variable attenuator 64 and resistor 238 provides an additional ground path from input lead 36 of amplifier 26. Under these conditions, the circuit configuration of FIG. 6B continues to apply; however, resistor 238 (shown dotted) is now present in the circuit. By appropriate selection of the value of resistor 238, there may result the condition in which the positive feedback at the desired vibration frequency exceeds the negative feedback at that frequency. Accordingly, the system will oscillate at the chosen frequency and will continue to reject all other frequencies. By appropriate selection of the values of the various resistors, it may be assured that upon closure of switch 240 sufficient negative feedback will remain to prevent oscillation at any frequency other that than for which filter 225 is set.

Recalling now that the normal position of switch 62 shown in FIG. 2 effectively decouples the input signal it may be seen that the oscillator is effectively freeat terminal 10 from input 22 of multimode circuit 24, running and will bear a random-phase relationship with the vibration of the unbalanced member. With switch 62 open, the multi-mode circuit 24 may be then readily used to trigger stroboscope 52 to determine the actual rotational speed of the unbalanced member, or for various other purposes requiring a variable-frequency pulse light source, as has been accomplished with stroboscope firing oscillators in the past.

However, according to the present invention, and contrary to past practice in vibration balancing, it has now been found that for the oscillatory modes, if the frequency of oscillation of circuit 24 is maintained the same as the frequency of rotation of the unbalanced member, a direct connection of the vibration signal to multimode circuit 24 creates a precise phase locking of the oscillator output with the vibration signal. Thus, pursuant to the invention, there is provided—through the circuit comprising input terminal 10, switch 62 in its off-normal position, switch 54 in its off-normal position, preamplifier/ variable-attenuator 14, selector 16 and calibrator 20— to the negative input of differental amplifier 26, a relatively small vibration signal component at the frequency of oscillation selected by filter 225, which has been found to cause the oscillations generated to be locked in phase with the vibration signal so as to trigger the stroboscope for use in the balancing method previously outlined.

In practice, only a small level of vibration input signal, e.g. an amplitude of approximately 1/10 the amplitude of oscillation is necessary to synchronize the oscillator. As a matter of fact, it has been discovered that the provision of too high a vibration input-signal level substantially nullifies the highly advantageous results achieved with smaller signals.

Referring now to FIG 4, there is shown a circuit diagram of average detector 42, and meter circuit 46 comprising the remainder of the functional blocks shown in FIG. 1. As may be seen, the output signals apearing on leads 38 and 40 are connected through blocking capacitors 244 and 246 to the base terminals of transistors 248 and 250. Collectors 252 and 254 are connected in common to a resistor 256 and to the positive power supply, while collectors 258 and 260 are connected in common to ground through resistors 262. Transistors 248 and 250 comprise a full-wave rectifier whose output appears across resistor 262. This output is connected to an averaging circuit comprised of resistor 264 and capacitor 266, which provides a signal at base 268 of transistor 270 proportional to the average value of the AC signal appearing on leads 38 and 40.

Collector 272 of transistor 270 is connected to base 274 of transistor 276. These transistors operate as a high-input-impedance/low-output-impedance DC amplifier having substantially unity gain. The output thereof is provided over lead 44 to a suitable metering circuit.

As shown, metering circuit 46 may comprise a suitable ammeter 278 shunted by a resistor 280. The positive meter input may be provided on lead 44, while the negative input may be provided over lead 282 and normally closed switch 284 from a suitable DC deference level or ground. Switch 284, which may be mechanically coupled to switches 54 and 240, serves in its off-normal position to disconnect meter movement 278 to remove the current path therefrom, whereby there is not registered on the meter signals corresponding to the average value of the output of circuit 24 when it is operating in its oscillating mode.

Thus there has been described a vibration-analyzing system which, while retaining all of the desirable features of previously available equipment, provides in addition an unexpected and highly desirable, feature—namely, an extremely great increase in the accuracy with which vibration due to rotor imbalance may be eliminated.

Briefly summarized, the above-described invention may be used in the following manner. To measure vibration amplitude, multimode circuit 24 is operated in the broad band amplitude mode. For this, switches 54, 160, 228, 240, and 284 are all set at their normal positions as shown in the drawings. Switch 142 may be set in either of the positions shown, depending on whether it is desired to measure the amplitude or the velocity of the vibration. Switch 70 is set to any appropriate position, depending on the amplitude of the signal being measured. Under these circumstances, it may be seen that meter 278 will indicate the average value of the vibration signal provided at input terminal 10.

If desired, switches 156 and 228 may be positioned in any appropriate off-normal setting, and a particular vibration frequency selected by means of resistors 220 and 222 and capacitors 216 and 218, thereby measuring the vibration at a particular desired frequency. This constitutes the tuned amplifier mode of multimode circuit 24.

If the frequency of interest is the rotational frequency of the machine, the same may be readily identified by positioning switches 54 and 240 in their off-normal positions, whereby circuit 24 will operate in the variable-frequency, free running oscillator mode. By adjusting the frequency until a mark on the rotating member appears "frozen" when illuminated by stroboscope 52, the rotational frequency of the machine may be determined in well-known fashion. Then the filter frequency may be set in accordance with the rotational speed of the machine, and a highly accurate balance of the rotating part may be achieved.

To accomplish this, it is merely necessary to adjust the frequency of the multimode circuit 24 in its free-running oscillator mode—i.e., with switch 62 in its normal position—until the appropriate mark on the rotating member is precisely fixed, and then to activate the synchronized oscillator mode by closing switch 62. Under this condition the mark on the rotating member will appear to move for a certain period of time, and will then come to rest. As may be understood, variation in the amount of the input signal provided by switch 62 may be readily accomplished by changing the settings of variable attenuator 64. If too great a degree of attenuation is provided, when switch 62 is closed, the mark will appear to move very slowly from the position when illuminated by the free-running strobe. For extremely large amounts of attenuation (small levels of vibration input signal), the mark does not come to rest in a reasonable length of time.

To overcome this, it is only necessary to decrease the degree of attenuation provided by switch 70, and the change in the angular position is more rapid. However, if insufficient attenuation is provided—i.e., too large a vibration input signal is injected—the apparent position of the mark changes very rapidly, but overshoots the desired position; and for sufficiently small values of attenuation (large values of vibration input signal), tends to oscillate continuously about the equilibrium position, thereby introducing the very type jitter present with previously available equipment. This, of course, is precisely the type of problem which the present invention is capable of overcoming; therefore, appropriate operation requires that there be sufficient attenuation of the input signal to allow the oscillator to be locked to the vibration signal rapidly, with a minimum of overshoot.

The angular measurements of the position of the mark with and without the test weight may be made as previously described, thereby greatly facilitating the precise placement of the final weight with an accuracy heretofore not thought possible. In this regard, it will be appreciated that the seven-step test procedure set out above is generally followed in the practice of the present invention, with suitable modification as reflected in the selectable modes of multimode circuit 24. Thus, in a modified seven-step balancing procedure as applied to the present invention, correction of rotor imbalance would proceed as follows:

(1) Multimode circuit 24 is placed in its free running oscillator mode and the oscillator frequency is adjusted until a mark on the rotating member is essentially frozen. The synchronized oscillator mode is then actuated and the exact angular position of the mark noted after the synchronized oscillator "locks in." Multimode circuit 24 is then switched to the tuned amplifier mode and the vibration amplitude at the rotational frequency is measured.

(2) The angular position of the mark and the vibration amplitude are plotted in polar coordinates.

(3) The machine is stopped and a test weight is attached.

(4) The machine is started again and multimode circuit 24 is returned to the synchronized oscillator mode for angular position measurement. As before, vibration amplitude measurement is made with multimode circuit 24 in the tuned amplifier mode. A second vector, based on the angle and amplitude measurements thus obtained, is plotted "tail-to-tail" with the first vector.

Previously stated steps (5)-(7) are now followed identically and final balancing is achieved.

While a particular embodiment of the above invention has been described in considerable detail, it should be recognized that a wide variety of changes may be made within the scope of the invention. For example, while the particular details of the power supply have not been given, it should be recognized that a suitable regulated power supply will be included in the system, or, if desired, the system may be operated by means of a suitable battery. In addition, if it is desired, appropriate battery-charging equipment may be included, and siutable connections may be made by a multiple-position switch whereby meter 278 may be connected to the battery in order to determine the state of the charge thereof. Furthermore, the various switches shown and described in the above specification are intended to be only schematic and to represent the functional effect necessary to provide operation according to the methods described. Therefore, it should be recognized that a wide variety of possible switching configurations may be substituted for those shown, whereby the operation of the device as a compact and sealed unit may be greatly facilitated. For example, in one suitable embodiment of the present invention, there may be provided a so-called "mode" switch providing either velocity measurement, amplitude measurement, or strobe oscillation. In addition, there is provided a decade switch for selectively connecting a plurality of capacitors which may comprise each of the variable capacitors 216 and 218. Similarly, various of the other switch functions described above may be mechanically linked as appropriate to the particular problems which are encountered.

Thus the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vibration analyzer for use in the elimination of imbalance-caused vibration in a rotating machine, comprising: a transducer for providing a signal representative of the virbation of the member to be balanced; and amplifier having input and output means; means for providing negative signal-feedback around the amplifier; further means for providing positive signal-feedback around the amplifier at a determinable frequency; means to adjust the ratio of the positive and negative feedback so that one or the other may predominate, the amplifier having a wideband characteristic when the positive feedback is substantially zero, having a highly-selective narrow-band pass characteristic centered at the determinable frequency when the negative feedback is slightly in excess of the positive feedback at the frequency, and having a constant amplitude oscillation characteristic at the determinable frequency when the positive feedback slightly exceeds the negative feedback at that frequency; a stroboscope responsive to the amplifier output to provide a series of light pulses in synchronism therewith; means for continuously connecting the transducer output to the amplifier input when the negative feedback exceeds the positive feedback, and for connecting the transducer output to the amplifier input when the positive feedback exceeds the negative feedback, whereby to effect phase synchronism between oscillation generated by the amplifier and any component of the transducer output at the oscillation frequency, so that the light pulses produced by the stroboscope are in phase synchronism with the virbation components at the light-pulse frequency.

2. The appartus of claim 1 where the last-named means further includes means to selectively disconnect the transducer output from the amplifier input when the positive feedback exceeds the negative feedback, whereby to permit complete phase asynchronism between the transducer output and the light pulses provided by the stroboscope.

3. The virbation analyzer of claim 1 wherein the vibration transducer provides a signal proportional to the velocity of the vibrating member; and where the means for connecting the transducer output to the amplifier input includes a high gain amplifier, and means to selectively provide either capacitive or resistive negative feedback therearound, whereby to selectively effect either the integration or amplification of the velocity signal provided by the vibration transducer.

4. A vibration analyzer for use in the elimination of imbalance-caused vibration in a rotating machine comprising: a transducer for providing a signal representative of the vibration of the member to be balanced; an amplifier; means for providing substantially single frequency positive feedback and wide band negative feedback around the amplifier; means to adjust the ratio of the positive and negative feedback so that one or the other may predominate, the amplifier having a wide band characteristic when the positive feedback is substantially zero, having a highly selective narrow band-pass characteristic centered at the single frequency when the negative feedback is slightly in excess of the positive feedback at that frequency, and having a constant-amplitude oscillation characteristic at the single frequency when the positive feedback slightly exceeds the negative feedback at that frequency; a stroboscope responsive to the amplifier output to provide a series of light pulses in synchronism therewith; means for connecting the transducer output to the amplifier input, whereby to effect phase synchronism between the oscillation generated by the amplifier and any component of the transducer output at the oscillation frequency; the connecting means including means to variably attenuate the transducer output signal to provide an input to the amplifier sufficient to establish rapid phase synchronization, but insufficient to permit cyclic phase variation of the amplifier output.

5. The apparatus of claim 4 where the transducer comprises means to generate a signal representative of the velocity of vibration of the member to be balanced; and where the connecting means includes means connected to the transducer output to selectively provide a signal representative of the transducer output itself, or of the integral thereof.

6. A vibration analyzer for use in the elimination of imbalance-caused vibration in a rotating machine, comprising: a transducer for providing a signal representative of the vibration of the member to be balanced; active circuit means having three selectable modes of operation, the first mode of operation providing a substantially flat wide-band amplifier characteristic, the second mode providing a sharply tuned amplifier characteristic of the variable resonant frequency, and the third mode providing a variable frequency oscillator characteristic; a stroboscope responsive to the output of the circuit means to provide a series of light pulses in synchronism therewith; and means for connecting the transducer output to the input of the active circuit means, to effect phase synchronism between the oscillation generated by the circuit means and any component of the transducer output at the oscillation frequency, said active circuit comprising an amplifier; a negative feedback path around the amplifier having a substantially resistive characteristic; a second feedback network including a resistive negative feedback portion, and a frequency dependent positive feedback portion, the negative feedback normally predominating at all frequencies; means to selectively decrease the negative feedback to permit the predominance at one frequency of the positive feedback; and means to vary the frequency characteristic of the positive feedback portion to permit selection of the frequency at which positive feedback may predominate.

7. The apparatus of claim 6 where the active circuit means further includes means for selectively disabling the second feedback network, the first mode of operation being provided when the second feedback network is disabled, the second mode of operation being provided when the second feedback network is not disabled, but when the negative feedback predominates at all frequencies, and the third mode of operation being provided when the negative feedback at all frequencies is decreased, so that positive feedback predominates at a particular frequency.

8. Apparatus for determining the locus of imbalance of a rotating member in a machine comprising: a vibration transducer to provide a signal representative of the vibration of the machine including the vibration of the unbalanced member; a multimode circuit coupled to said vibration transducer, said multimode circuit including amplifier means coupled to the transducer output, feedback means and shunt means for said amplifier, and means for adjusting said feedback and shunt to provide stable operation constituting an amplifier mode for said multimode circuit, and unstable operation constituting an oscillatory mode for said multimode circuit; a stroboscope; means coupled to the output of said multimode circuit and responsive to said oscillatory mode for triggering said stroboscope in frequency and phase synchronism therewith; and measuring means coupled to said multimode circuit for producing a measure of the output of said vibration transducer when said multimode circuit operates in said amplifier mode, said feedback means including first resistive path and a second path including a reactive circuit means, the former producing degenerative feedback for all frequencies, and the latter producing regenerative feedback over a selectable range of frequencies.

9. Apparatus as defined in claim 8 wherein said means for adjusting said feedback means and said shunt means comprises means selectably connecting said amplifier to ground through a resistor to reduce the degree of degenerative feedback, and means for selectably connecting said second feedback path into and out of said feedback means, thereby to insert regenerative frequency dependent feedback between the input and output of said amplifier means to produce oscillation when said amplifier is grounded by said shunt means, and to provide stable, tuned amplifier operation for said multimode circuit when said shunt means is disconnected.

References Cited

UNITED STATES PATENTS

| | | | |
|---|---|---|---|
| 2,975,640 | 3/1961 | Quell | 73—466 |
| 3,228,235 | 1/1966 | Thomas | 73—466 XR |
| 3,331,252 | 7/1967 | Thomas et al. | 73—462 |

JAMES J. GILL, Primary Examiner

PO-1050
(5/69)

UNITED STATES PATENT OFFICE
CERTIFICATE OF CORRECTION

Patent No. 3,533,296　　　　　　　　　Dated　　October 13, 1970

Inventor(s)　GEORGE B. FOSTER ET AL

It is certified that error appears in the above-identified patent and that said Letters Patent are hereby corrected as shown below:

Column 1, line 1 of the Abstract, "method and" should be cancelled. Column 1, line 41, after "without" insert -- the --. Column 4, line 72, "vibrating-sensing" should read -- vibration-sensing --. Column 5, line 27, "circut" should read -- circuit --. Column 6, line 24, "35" should read -- 36 --. Column 7, line 21, "multimore" should read -- multimode --. Column 9, line 39, "transistors" should read -- transistor --. Column 11, line 11, "stroke" should read -- strobe --; line 12, "stroke" should read -- strobe --. Column 12, line 75 should read -- at terminal 10 from input 22 of multimode circuit 24, --. Column 13, line 1 should read -- it may be seen that the oscillator is effectively free- --; line 22, "differental" should read -- differential --; line 60, "deference" should read -- reference --. Column 14, line 2, "amplitude" should read -- amplifier --. Column 15, line 30, "siutable" should read -- suitable --; line 65, "virbation" should read -- vibration --. Column 16, line 1, "the" should read -- that --; line 15, "virbation" should read -- vibration --; line 23, "virbation" should read -- vibration --. Column 17, line 6, "synchronism" should read -- synchronization --.

SIGNED AND
SEALED
MAR 16 1971

(SEAL)
Attest:

Edward M. Fletcher, Jr.
Attesting Officer

WILLIAM E. SCHUYLER, JR.
Commissioner of Patents